United States Patent [19]

Viertel et al.

[11] Patent Number: 5,221,120
[45] Date of Patent: Jun. 22, 1993

[54] RECYCLABLE MATERIAL SUN-VISOR FOR AUTOMOTIVE VEHICLES

[75] Inventors: Lothar Viertel, Altforweiler, Fed. Rep. of Germany; René Lecorvaisier, Hombourg-Haut, France

[73] Assignee: Gebr. Happich GmbH, Fed. Rep. of Germany

[21] Appl. No.: 830,617

[22] Filed: Feb. 4, 1992

[30] Foreign Application Priority Data

Mar. 9, 1991 [DE] Fed. Rep. of Germany ........ 4107696

[51] Int. Cl.⁵ .............................................. B60J 3/00
[52] U.S. Cl. .................................... 296/97.1; 296/901
[58] Field of Search ............................ 296/97.1–97.5, 296/97.9–97.12, 901

[56] References Cited

U.S. PATENT DOCUMENTS

| | | | |
|---|---|---|---|
| 4,626,019 | 12/1986 | Tung et al. | 296/97.1 |
| 4,763,946 | 8/1988 | Robbins et al. | 296/97.1 |
| 4,998,765 | 3/1991 | Van Order et al. | 296/97.1 |
| 5,108,143 | 4/1992 | Miwa | 296/97.1 |

FOREIGN PATENT DOCUMENTS

| | | |
|---|---|---|
| 3706092 | 3/1987 | Fed. Rep. of Germany . |
| 3824186 | 2/1989 | Fed. Rep. of Germany . |
| 599999 | 12/1976 | U.S.S.R. . |

Primary Examiner—Robert R. Song
Attorney, Agent, or Firm—Ostrolenk, Faber, Gerb & Soffen

[57] ABSTRACT

A sun-visor for motor vehicles having a sun-visor body which consists essentially of recyclable plastic material. A metallic detent spring is held in the sun-visor body and clamps a support shaft which detachably engages into a bearing opening of the sun-visor body. A rail over the top edge of the visor body and a foil covering over the visor body are also of recyclable plastic material.

19 Claims, 2 Drawing Sheets

RECYCLABLE MATERIAL SUN-VISOR FOR AUTOMOTIVE VEHICLES

BACKGROUND OF THE INVENTION

The present invention relates to a sun-visor for automotive vehicles which is customarily attached to the vehicle body above the windshield and is to be swung from a position of non-use below the roof of the vehicle into a position of use in front of the windshield. The invention particularly relates to the materials of which the sun visor is formed.

There are a large number of embodiments of sun-visors for motor vehicles. Known sun-visors have in common a multi-part construction, and they are assembled from components of quite different materials. Frequently, the sun-visors include a stiffening insert which is formed of a steel wire, cushioning of a foamed polyurethane, bearing brackets of PVC, and coverings which are formed of PVC, textiles, leather, etc. This traditional construction of sun-visors makes it difficult, and frequently impossible, to separate the sun-visors into their individual parts, for the further use or recycling of those parts upon the scrapping of a motor vehicle.

SUMMARY OF THE INVENTION

It is an object of the present invention to provide a sun-visor which, at the end of its useful life, can be used further or recycled without special expense.

In order to achieve this, a sun-visor according to the invention consists essentially of recyclable plastic material. The sun-visor body may consist of a single plastic material, and polypropylene (PP) is preferably employed for this purpose. The only exception to the single material comprises a preferably metal detent spring which is held within the sun-visor body to clamp a bearing shaft, and that shaft detachably engages into a bearing opening in the sun-visor body.

The sun-visor of the invention thus contributes considerably to the general desire to protect the environment, since the material used in its manufacture can be recycled without particular difficulty to be used for a new purpose. With the sun-visor of the invention, it is merely necessary to separate the detent spring from the plastic material visor body. This step is simplified because there is no physical attachment between the material of the sun-visor body and the detent spring. The bearing shaft which supports the sun-visor body is, in any event, connected detachably to it, and this avoids difficulty in recycling.

Other features and advantages of the present invention will become apparent from the following description of the invention which refers to the accompanying drawings.

DESCRIPTION OF THE PREFERRED EMBODIMENTS

Figure 1:
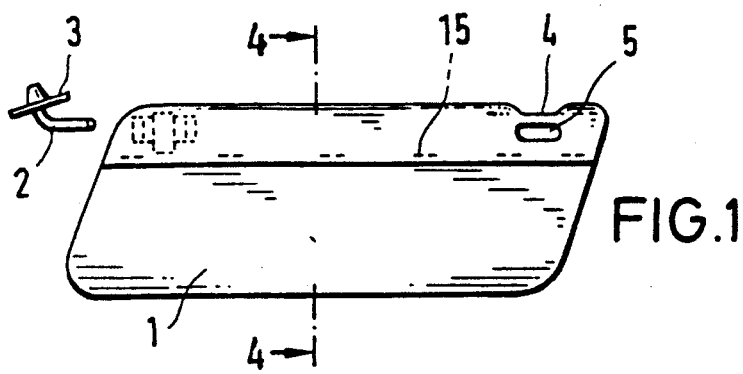
FIG. 1 is a view in elevation of a sun-visor according to the invention.
Figure 2:
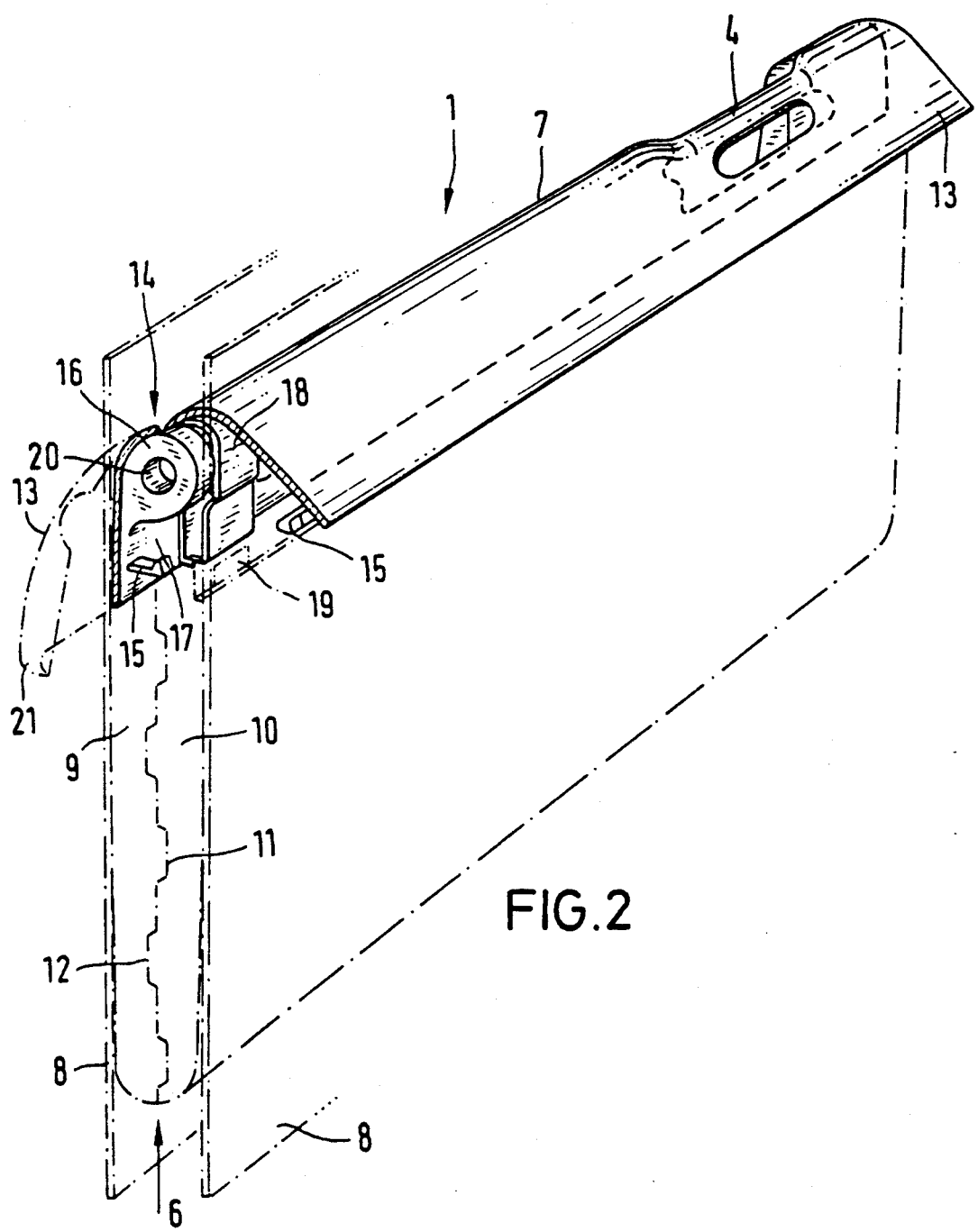
FIG. 2 shows the sun-visor of FIG. 1 in an intermediate stage of its assembly.

The sun-visor embodiment of FIGS. 1 and 2 includes a generally cushioned sun-visor body 1 which receives a supporting shaft 2 at one upper corner of the visor body. A bracket 3 on the shaft 2 attaches the sun-visor body 1 to the body of the motor vehicle in the vicinity of and particularly above the vehicle windshield.

The shaft 2 is rotatably mounted in a below described receptacle in the sun-visor body 1. The shaft is also held in the bracket 3 to enable swinging the sun-visor body 1 both downward against the windshield and to the side against a side window. An outer support shaft 4, which is toward the other upper corner of the visor body and is aligned with the support shaft 2, crosses over the upper end of an opening 5 in the sun-visor body 1. The outer support shaft is received on a bracket above the windshield in the vehicle body.

The sun-visor body 1 generally comprises an approximately rectangular core 6 of a generally thin front to rear thickness, a rail 7 of U-shaped cross section which wraps around the upper longitudinal edge of the core 6 and grips the front and rear surfaces down from the upper edge, and a foil covering 8 which is wrapped around the core 6 and the rail 7. As described below, all of these visor elements are formed of a single plastic material, preferably polypropylene.

The core 6 is formed of a polypropylene particle foam. It comprises two full visor body height and width core halves 9, 10, which rest against each other generally in the center plane of the thickness of the visor. The core halves 9, 10 are held and fixed to each other by interengaging projections 11 and recesses 12 defined in their facing surfaces. One core half is of relatively hard material, so as to assure the dimensional stability of the sun-visor body 1, while the other core half is of relatively soft material, so as to produce a cushioning effect. The soft half of the core is located on that side of the visor that, in its position of use, faces the user.

The U-shaped rail 7 consists of a generally rigid polypropylene injection molding. It has a rounded web around the upper edge of the core, which joins its legs 13 which extend down the front and rear core surfaces. The legs 13 are connected to each other by a flexible film hinge 14, which extends over the length of the web. Hooking means 15 for holding the rail on the core, bearing lugs 16 for receiving the shaft 2 and holding arms 17 for a detent spring are integrally formed on the inner sides of the legs 13 of the rail 7. The holding arms 17 serve to hold a generally U-shaped metallic detent spring 18 of customary construction. After the insertion of the detent spring 18 into the U-shaped rail 7, the rail, with its legs 13 still spread apart, can be placed over a longitudinal side of the core 6 and can then fastened to the core 6 by pressing its legs 13 together. The hooking means 15 pass through aligned openings 19 in the core and the means 15 engage with each other. For that purpose, the means 15 are provided with clip projections. After the fastening of the U-shaped rail 7 to the core 6, the longitudinal holes 20 in the bearing lugs 16 are aligned with each other so that, after insertion of the support shaft 2 into the holes 20 of the bearing lugs 16, an additional, absolutely dependable interlocking is obtained. The core has a cutout or opening so that the detent spring at the inside of the rail can reach to the shaft 2.

As shown in phantom in FIG. 2, the U-shaped rail 7 can be developed with end closure walls 21.

The outer support shaft 4 is also integrally formed with the U-shaped rail 7.

Figure 3:
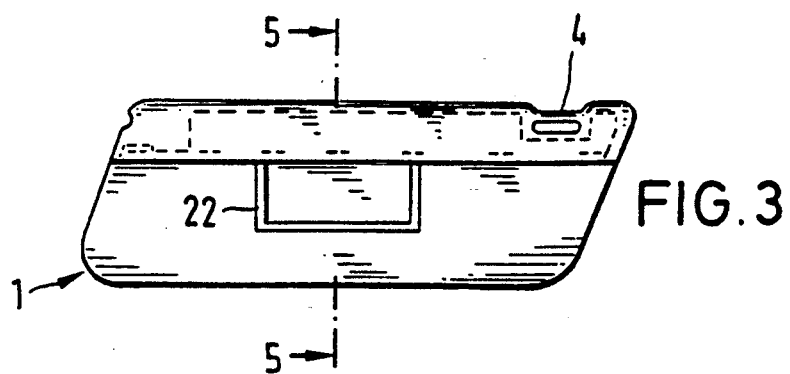
FIG. 3 is a view in elevation of a second sun-visor embodiment.
Figure 4:
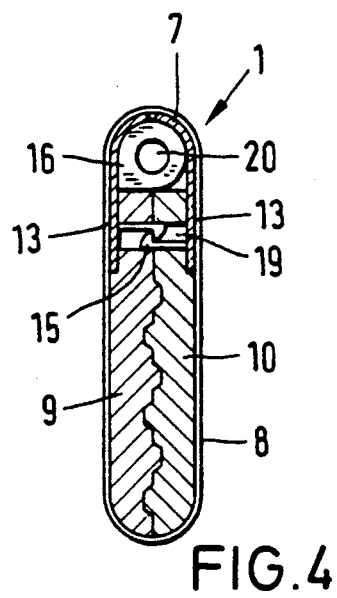
FIG. 4 is a section along the line A—A of FIG. 1.
Figure 5:
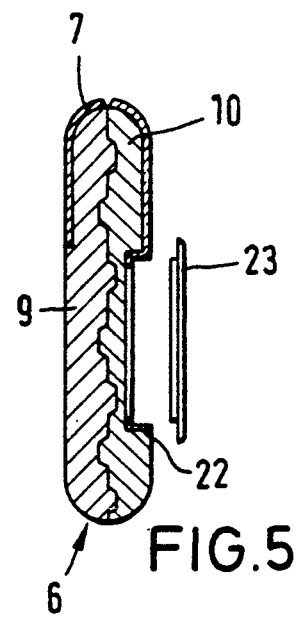
FIG. 5 is a section along the line B—B of FIG. 3.
Figure 6:
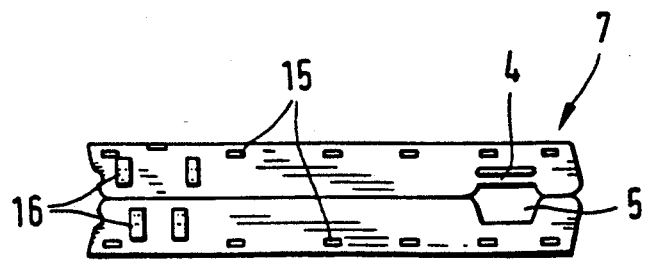
FIG. 6 shows a detail of the sun-visor.

As shown in FIGS. 3 and 5, the rail 7 can have developed integrally on it, a mirror receiving frame 22 for a mirror frame with mirror 23. The attachment of the mirror receiving frame 22 to the rail 7 should be of such a nature that if the frame is not required it can be broken away, which is readily possible by the provision of points of intended breakage. A suitable recess 24 for the mirror receiving frame is provided in the core 6.

After the insertion of the detent spring 18 into the rail 7 and the bringing of the rail together with the core 6, the sun-visor body 1 is covered with a foil covering 8 in accordance with traditional methods. The foil blanks of the covering, however, consist in this case of polypropylene, just like all of the essential parts of the new sun-visor.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A sun-visor for automotive vehicles comprised of a sun-visor body having a core consisting of recyclable plastic material, the core being approximately rectangular in shape and having opposite longitudinal edges;
   a rail of recyclable plastic material and having a u-shaped cross-section, the rail being positioned around one of the longitudinal edges of the core and gripping the core near the longitudinal edge;
   a separate detent spring held within the sun-visor body;
   a bearing of recyclable plastic material, including an opening disposed within the rail;
   a support shaft extending into the bearing opening, and the spring being supported in the sun-visor body at the bearing opening for clamping the shaft said core, rail and bearing being of same recyclable proper ties.

2. The sun-visor of claim 1, wherein the spring is a metallic detent spring.

3. The sun-visor of claim 1, wherein the sun-visor body consists of a single plastic material.

4. The sun-visor of claim 1, wherein the sun-visor body consists of polypropylene.

5. The sun-visor of claim 1, wherein the core consists of polypropylene particle foam and the rail consists of polypropylene.

6. The sun-visor of claim 1, further comprising a foil covering of recyclable plastic material which is wrapped around the core and the rail.

7. The sun-visor of claim 6, wherein the spring is a metallic detent spring.

8. The sun-visor of claim 1, wherein the rail includes bearing lugs developed thereon and positioned for receiving and supporting the support shaft therein.

9. The sun-visor of claim 8, wherein the rail further has holding arms thereon for receiving and holding the detent spring.

10. The sun-visor of claim 9, wherein the rail is an injection molded element.

11. The sun-visor of claim 9, wherein the U-shaped rail is shaped to have a rounded web at the edge of the core and legs extending along the sides of the core, and the rounded web includes a film hinge which extends over the length of the web and by which the legs of the rail are connected to each other.

12. The sun-visor of claim 11, wherein the legs of the web include interengageable hooking means thereon which are adapted to interengage when the legs of the rail are moved together, a respective opening through the core at the hooking means through which the hooking means can pass for interengaging, the hooking means being arranged on the inner sides of the legs of the rail.

13. The sun-visor of claim 11, wherein the bearing lugs are developed on both legs of the rail.

14. The sun-visor of claim 1, wherein the core includes two core halves each of rectangular shape and meeting across the thickness dimension of the visor body, one core half being of relatively hard recyclable plastic material to serve as the support for the sun-visor body and the other core half being of relatively soft material to serve as a cushioning body.

15. The sun-visor of claim 1, wherein the U-shaped rail is shaped to have a rounded web at the edge of the core and legs extending along the sides of the core, and the rounded web includes a film hinge which extends over the length of the web and by which the legs of the rail are connected to each other.

16. The sun-visor of claim 15, wherein the rail has an integral outer support pin developed on it at a distance along the rail from the bearing lugs for the support shaft.

17. The sun-visor of claim 1, further comprising a mirror receiving frame defined in the U-shaped rail.

18. The sun-visor of claim 17, wherein the core has an opening therein positioned and shaped to receive the frame on the rail.

19. A sun-visor for automotive vehicles comprising:
   a core consisting of a recyclable plastic material, the core being approximately rectangular in shape and having opposite longitudinal edges;
   a rail of recyclable plastic material and having a u-shaped cross-section, the rail being positioned around one of the longitudinal edges of the core and gripping the core near the longitudinal edge;
   a separate detent spring held within the sun-visor body;
   a bearing having an opening disposed in the rail;
   holding arms disposed on the rail; and
   a support shaft extending into the bearing opening, wherein the spring is supported in the sun-visor body at the bearing opening by the holding arms to clamp the support shaft said core, rail and bearing being of some recyclable proper ties.

* * * * *